A. B. NORWALK.
TIRE VALVE.
APPLICATION FILED NOV. 14, 1916.

1,223,345.

Patented Apr. 17, 1917.

INVENTOR
Albert B. Norwalk
BY
Henry D. Williams
ATTORNEY

UNITED STATES PATENT OFFICE.

ALBERT B. NORWALK, OF NEW YORK, N. Y.

TIRE-VALVE.

1,223,345.  Specification of Letters Patent.  Patented Apr. 17, 1917.

Application filed November 14, 1916. Serial No. 131,212.

*To all whom it may concern:*

Be it known that I, ALBERT B. NORWALK, a citizen of the United States, residing in the borough of Manhattan, city of New York, in the county of New York and State of New York, have invented certain new and useful Improvements in Tire-Valves, of which the following is a specification, reference being had therein to the accompanying drawings, forming part thereof.

My invention relates to tire valves and has for its objects secure sealing, easy opening under low air pressure, and secure housing and protection of the more delicate parts. Other objects of my invention are simplicity of construction, inexpensiveness of manufacture, reliability, durability, and other objects and advantages which will hereinafter appear.

My invention includes features of construction and combinations of parts as will appear from the following description.

I shall now describe the tire valve construction embodying my invention illustrated in the accompanying drawings and shall thereafter point out my invention in claims.

Figure 1:
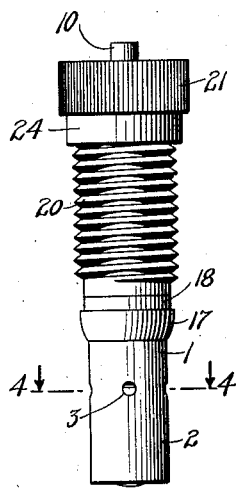
Figure 1 is an elevation, and Fig. 2 a central longitudinal section of a tire valve embodying my invention.
Figure 2:
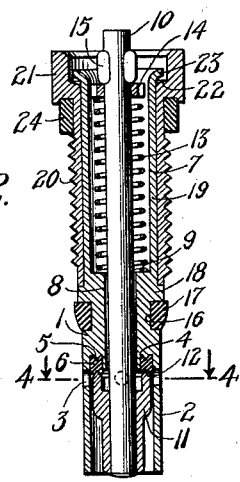

The tire valve embodying my invention illustrated in the accompanying drawings comprises a tubular sealing member having a body 1 provided with a thin cylindrical extension forming a skirt 2 which is freely or fully open at its lower end, as appears in Fig. 2, and which, in its upper part, is provided with a circumferential series of circular apertures 3 forming air inlet openings, these air inlet openings 3 being shown as four in number equidistantly spaced. Above the air inlet openings 3 in the skirt 2 the lower or inner end of the body 1 is provided, as appears in Fig. 2, with an annular seating groove having an inner wall 4 and the outer wall of which is formed by the upward continuation of the skirt 2 from the air inlet openings 3. The bottom of this annular seating groove is provided, as appears in Fig. 2, with an annular V-shaped or sharp-edged sealing ridge 5 which projects inwardly or downwardly from the bottom surface of the groove. This annular seating groove contains a sealing ring 6 of suitable material such as soft rubber which fits snugly in the groove and the otherwise upper flat surface of which is indented by the sharp edge of the annular V-shaped downwardly projecting sealing ridge 5. The sealing ring 6 projects or extends downwardly substantially flush with the upper edges of the air inlet openings 3 and correspondingly substantially flush with the lower edge of the inner wall 4 of the ring-containing groove.

The sealing member or valve tube has a longitudinal bore or passage which has an outer portion 7 of larger diameter and an inner portion 8 of reduced diameter which extends through the body 1 to the free edge of the wall 4 within the skirt 2, an inner shoulder 9 being formed in this bore outward from the body 1 between the two parts 7 and 8 of the longitudinal passage. A cylindrical valve pin 10 extends through the tubular sealing member or valve tube and at its inner end, within the skirt 2, carries a cup-shaped valve head 11. In its inner or lower part the valve head 11 is shown as of reduced diameter, but in its upper part it substantially loosely fills and is adapted to be guided by the inner surface of the cylindrical skirt 2. The upper edges 12 of the cup forming the valve head 11 are angular or sharp and are shown as of V-shape. The V-shaped cup edges 12 of the valve head 11 are in alinement with the sharp V-shaped sealing ridge 5 at the bottom of the groove which contains the soft rubber sealing ring 6, and this sealing ring 6 is gripped and pressed between the oppositely arranged or opposing V-shaped edges, thereby assuring an air-tight seal at this point.

A coiled compression spring 13 surrounds the valve pin 10 within the larger part 7 of the bore and acts between the internal shoulder 9 and a small stop plate 14 on the outer end of the valve pin 10, this stop plate 14 being held in place by abutments 15 formed by pinching the valve pin 10 adjacent to its outer end, as appears in Fig. 2.

The construction above described of the tire valve of my invention permits the cup-shaped valve head 11 to be made of large diameter with a large area for air pressure within its V-shaped sealing ridge or sealing edge 12, whereby in the operation of inflating the tire the valve will be opened or unseated by a very low air pressure of the air delivered by the tire pump. There is a great advantage in this as it will be readily seen that it enables the attainment of higher pressure in the tire with correspondingly lower pressure in the air delivered by the pump, thereby both rendering the pump more effective for inflation and lessening the work of pumping. Also it is to be noted that a correspondingly large escape area for the air is provided from within the skirt 2 above the valve head 11 through the ample air inlet opening 3, and thence down along the outside of the skirt 2, as will hereinafter appear.

The remaining features of the tire valve construction shown in the drawings as embodying my invention are substantially the same as disclosed and claimed in my copending application for tire valves filed March 21, 1916, Serial No. 85,543, and will now be briefly described. The central body 1 of the tubular sealing member or valve tube has provided therein an annular groove 16 for the reception of a sealing ring 17 of suitable material such as soft rubber, this sealing ring 17 being tapered as shown so as to form a tight stopper-like seal within the bore of the tire tube, as will presently appear. Below or inward from the external annular groove 16 for the tapered sealing ring 17 the body 1 is of an even diameter with and merges into the outer cylindrical surface of the skirt 2, as clearly appears in the drawings. Above or outward from the annular groove 16 the body 1 is of somewhat larger diameter than below this groove and at a slight distance above the groove 16 is slightly reduced in diameter so as to provide a small external shoulder 18 and a long cylindrical bearing sleeve 19 at the outer end of the valve tube or tubular sealing member, the external shoulder 18 being shown as located a short distance inward from the internal shoulder 9.

A rotative tubular plug member has an externally screw-threaded shank 20 and an outer knurled head 21 and is rotatively mounted upon the bearing sleeve 19 of the non-rotative valve tube so as to abut against its outer shoulder 18. At the outer end of the head 21 the bore of this tubular plug member is enlarged to form a shoulder 22 which is engaged by a flange 23 shown as formed by turning over the outer end of the bearing sleeve 19. An outer sealing ring 24, which may be of soft rubber, is shown beneath the head 21 in a shallow annular recess therein and surrounding an upper smooth or unthreaded portion of the screw-threaded tubular shank 20. The valve pin 10 projects outwardly beyond the head 21 to provide in the usual way for purposely unseating the valve when desired. The tubular plug member, having the screw-threaded part 20 and outer head 21, constitutes means for pressing the valve-carrying tubular sealing member, having the body 1 and tapered sealing ring 17, into sealing relation within the bore of a tire tube, as will now be described.

Figure 3:
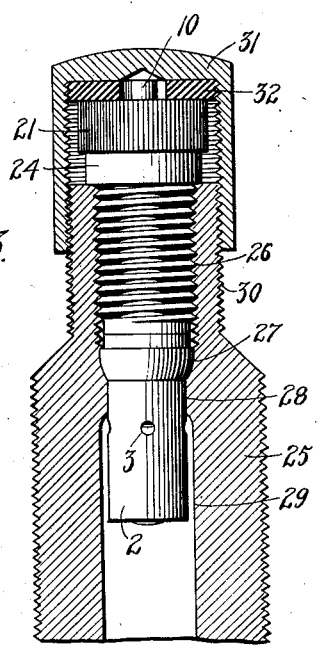
Fig. 3 is a central longitudinal section of the outer end of a tire tube with the tire valve of my invention appearing therein in elevation.
Figure 4:
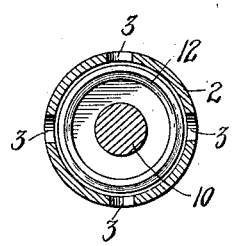
Fig. 4 is an enlarged transverse section of the tire valve on a horizontal plane indicated by the line 4—4 of Figs. 1 and 2 as viewed from above.

In Fig. 3 there is illustrated the outer end of a tire tube 25, the part of this tire tube shown in the drawing being of a usual construction and the remaining or omitted part may be of any suitable construction. The tire tube 25 is provided at its outer end with a screw-threaded socket 26. Inward from the socket 26 is a tapered sealing surface 27 and after this a short reduced bore 28 which is followed by a slightly enlarged bore 29.

Rotation of the projecting knurled head 21 of the tubular plug member to screw the shank 20 into the internally screw-threaded socket 26 of the tire tube 25 will cause the non-rotative tubular valve-carrying member to press the tapered sealing ring 17 into secure sealing relation with the inwardly tapered sealing surface 27 of the tire tube 25 without rotation of the sealing ring 17; also the outer sealing ring 24 forms a second seal upon the outer end of the tire tube 25.

It is to be noted that the cylindrical skirt 2 projects into the tire tube 25 beyond the reduced bore 28 and is contained within the enlarged bore 29 so that the air outlet openings 3 are exposed within this enlarged bore 29 and also so that an annular space of ample dimension for the ingress of air to the tire is provided around the skirt 2 within the enlarged bore 29, as clearly appears in Fig. 3. It is to be further noted that the cylindrical skirt 2 at all times houses and protects the rubber sealing ring 6 and the valve head 11 so that these parts are not exposed.

The tire tube 25 is provided with a usual externally screw-threaded outer end 30 of reduced diameter upon which is screwed a dust cap 31 containing a rubber gasket 32 which forms a seal with the outer surface of the knurled head 21 of the screw-threaded tubular plug member.

It is obvious that various modifications may be made in the construction shown in the drawings and above particularly described within the principle and scope of my invention.

I claim:

1. A tire valve construction comprising a tubular sealing member adapted to enter the outer end of a tire tube and provided at its inner end with a cylindrical extension forming a skirt having air inlet openings in the upper part thereof and having at the inside beyond said air inlet openings an annular seat groove provided with an annular projecting V-shaped bottom, a movable cup-shaped valve head within and guided by said cylindrical skirt and having an annular V-shaped sealing edge opposed to and substantially in alinement with the projecting V-shaped seat bottom, and a ring of packing material contained within said annular seat groove and adapted to be clamped between the V-shaped sealing edges of said seat and of said valve head.

2. A tire valve construction comprising a tubular sealing member adapted to enter the outer end of a tire tube and provided at its inner end with a cylindrical extension forming a skirt having air inlet openings in the upper part thereof and having at the inside beyond said air inlet openings an annular seat groove provided with an annular projecting V-shaped bottom, a movable cup-shaped valve head within and guided by said cylindrical skirt and having an annular V-shaped sealing edge opposed to and substantially in alinement with the projecting V-shaped seat bottom, a ring of packing material contained within said annular seat groove, a valve pin carrying the valve head at its inner end and extending outward into the tubular sealing member, and a valve-closing spring contained within the tubular sealing member and acting upon said valve pin to clamp the ring of packing material between the V-shaped sealing edges of the seat bottom and of the valve head.

3. A tire valve construction comprising a tubular sealing member adapted to enter the outer end of a tire tube and having at its inner end an annular seat groove provided with an annular projecting V-shaped bottom, a movable cup-shaped valve head having an annular V-shaped sealing edge opposed to and substantially in alinement with the projecting V-shaped seat bottom, and a ring of packing material contained within said annular seat groove and adapted to be clamped between the V-shaped sealing edges of said seat and of said valve head.

In testimony whereof I have affixed my signature.

ALBERT B. NORWALK.